United States Patent [19]

Boecker et al.

[11] Patent Number: 4,610,934
[45] Date of Patent: Sep. 9, 1986

[54] SILICON CARBIDE-TO-METAL JOINT AND METHOD OF MAKING SAME

[75] Inventors: Wolfgang D. G. Boecker, Lewiston; Laurence N. Hailey, Niagara Falls, both of N.Y.

[73] Assignee: Kennecott Corporation, Cleveland, Ohio

[21] Appl. No.: 692,944

[22] Filed: Jan. 17, 1985

[51] Int. Cl.⁴ ............................................. B32B 15/04
[52] U.S. Cl. .................... 428/627; 228/122; 228/263.12; 228/903
[58] Field of Search ........... 428/627; 228/122, 263.12, 228/903

[56] References Cited

U.S. PATENT DOCUMENTS

| | | | |
|---|---|---|---|
| 3,279,042 | 10/1966 | Fitzer et al. | 228/122 |
| 4,075,364 | 2/1978 | Panzera | 228/122 |
| 4,517,217 | 5/1985 | Hoffman | 428/627 |
| 4,532,190 | 7/1985 | Kanbe et al. | 428/627 |

Primary Examiner—L. Dewayne Rutledge
Assistant Examiner—Robert L. McDowell
Attorney, Agent, or Firm—David M. Ronyak

[57] ABSTRACT

A silicon carbide-to-metal joint includes a thin layer of metal adherent to the ceramic material, a compliant layer of metal overlying the thin metal layer and a brazing alloy in contact with the metal to which the ceramic material is joined.

A method for preparing a silicon carbide surface for joining by metallic brazing to a metal includes the steps of applying a thin layer of metal adherent to the ceramic surface followed by application of a compliant layer of metal.

Also described is an easily brazable silicon carbide article which includes a silicon carbide substrate, a thin electrically conductive adherent metal layer overlying the substrate and a compliant metal layer overlying the thin metal layer.

9 Claims, 3 Drawing Figures

SILICON CARBIDE-TO-METAL JOINT AND METHOD OF MAKING SAME

This invention relates to an easily brazable ceramic article, a method for preparing a ceramic surface for joining by metal brazing to a metal and a brazed ceramic-to-metal joint. More particularly, this invention relates to silicon carbide structural ceramic articles which are easily brazable and methods for preparing same and brazed joints between such articles and metals.

As used herein, the term "silicon carbide" includes any silicon carbide-based structural ceramic material including composite materials.

Structural silicon carbide articles have recently become of high interest as replacements for articles of metal and metallic alloys in structural applications such as engine components where a combination of strength, temperature resistance, oxidation resistance, hardness, wear resistance and low specific gravity are desired. However, known structural silicon carbide materials are not a panacea in all applications due to high cost, difficulty of fabrication, low rupture resistance and low mechanical impact resistance compared to metals and metallic alloys, particularly at lower operating temperatures. Thus, pragmatically, requirements of many applications would be best filled by use of articles having portions made of a silicon carbide and other portions made of metal or metallic alloy. These portions could be joined by brazing. However, structural silicon carbide andd metals exhibit dissimilar physical properties which make known brazing techniques of little use. For example, structural sintered silicon carbide has a coefficient of thermal expansion which is about one-half that of steel, a Young's modulus about twice that of steel and a strain to failure of less than 0.1 percent contrasted with several percent for steel. Additionally, silicon carbide is not wetted by common brazing alloys. Prior to the present invention, no technique was available by which silicon carbide could be joined to steel using common brazing alloys.

U.S. Pat. No. 2,871,139 to Wein discloses a silvering process for deposition of silver upon non-metallic objects such as glass for the production of mirrors, in which the surface to be silvered is carefully cleaned by treatment first with a caustic alkali solution, or nitric acid solution, to remove all grease, followed by rinsing with distilled water.

U.S. Pat. No. 3,296,012 to Stalnecker discloses an improvement in the adhesion of copper deposited by electroless or chemical deposition on ceramic surfaces. To obtain sufficiently strong anchorage, instead of being merely roughened or chemically etched, the surface of the ceramic must be leached so as to provide it with a sub-microscopically porous surface.

U.S. Pat. No. 3,690,921 to Elmore discloses a method for metal-plating alumina ceramic substrates, in which the substrate is prepared by cleaning with a hot alkaline solution, rinsing with water, immersing the substrate in concentrated alkali metal hydroxide solution and heating to a temperature sufficient to remove water from the solution and thereby deposit the solid alkali metal hydroxide on the surface, followed by further heating to a temperature above the melting point of the deposited alkali metal hydroxide for a time sufficient to cause the molten alkali metal hydroxide to alter the surface by etching both the alumina and the binder in the substrate and thereafter cooling, rinsing and neutralizing the alkali metal hydroxide. Alternately, the clean, dry substrate may be directly immersed in molten alkali metal hydroxide and rinsed as described before. The so treated substrate may then be subjected to electroless plating. The metal film is said to be strongly bonded to the ceramic substrate. The examples contained within this document indicate the method to be applicable to alumina ceramic substrates as well as zircon, beryllia, steatite or silicate glass-ceramics.

U.S. Pat. No. 4,109,050 to Meehan et al discloses a surface treatment method for making silicon-based ceramic composites having reduced tendency to form complex silicides when in contact with high performance metals or metallic alloys at elevated temperatures. The method is applicable to composites of silicon carbide-silicon. The method includes etching the surface of the silicon-based ceramic to effect removal of surface silicon, substantially filling the cavity resulting from such removal with an inorganic oxide mixture and firing the treated silicon-based ceramic to a temperature of up to 1250° centigrade, resulting in conversion of the inorganic oxide mixture to an adherent ceramic coating. Etching is accomplished by any of various standard techniques with a suitable etchant, e.g., mixtures of hydrofluoric and nitric acid. The etched surface is thereafter treated with an inorganic oxide blend of, for example, aluminum oxide and silicon oxide such as kyanite, ball clay, kaolin, etc.

U.S. Pat. No. 4,135,012 to Yao-Sin Su discloses chemical treatment of the surfaces of zirconia-base ceramics to produce micropitting or microcratering to enable durable adhesion of noble metal coatings by a mechanical keying or bonding of the coatings to the surface. The process includes at least five steps: contacting the smooth surface of the zirconia-base ceramic with a liquid leachant selected from concentrated sulphuric acid, ammonium bisulphate, alkali metal by sulphate and mixtures thereof, at a temperature of at least about 250° centigrade, for a time sufficient to effect micro-pitting and/or micro-cratering; removing the leached surface from contact with the leachant; contacting the leached surface with hydrochloric acid to effect removal of a residue thereon comprising sulphate of metal elements including zirconium in a ceramic; removing the leached surface, which is free of sulphate residue, from contact with the hydrochloric acid; rinsing the leached surface with water to remove acid residue therefrom. The metal coating (platinum) can be applied by any suitable technique known heretofore.

U.S. Pat. No. 3,011,920 to Shipley, Jr. discloses a method of electroless metal deposition in the form of an adherent metal coating, particularly on plastic panels, for the manufacture of printed circuits. The clean substrate is catalyzed by treatment with a bath containing colloidal particles of a catalytic metal and thereafter plating the substrate by treatment with a known deposition solution, e.g., a salt of nickel, cobalt, copper, silver, gold, chromium or members of the platinum family, and a reducing agent therefor, the catalytic metal being one known to catalyze the desired deposition. Superior results are claimed from use of colloidal solutions of a desired catalytic metal, followed by introduction into the appropriate plating bath.

U.S. Pat. No. 3,057,445 to Bronnes discloses a metal-to-ceramic seal and method of making same. The invention particularly relates to seals which are vacuum tight and may be employed in the construction of evacuated or gas filled envelopes for electrical devices. The structure of the seal includes a semi-conductive oxide material bonded to a ceramic member, the semi-conductive oxide having metal particles dispersed therein, a metal coating tightly bonded to the surface of the semi-conductive layer, which metal coating may then be secured a metal member by brazing. The seal is obtained by applying to the surface of the ceramic member a mixture of two oxides including an easily reduceable oxide and a difficultly reduceable oxide. Sealing is effected by first firing in an oxidizing atmosphere to cause the oxidic mixture to wet the ceramic and upon cooling effect a strong bond therewith. Thereafter, the assembly is fired a second time in a reducing atmosphere, causing partial reduction of the difficultly reduceable component of the mixture and formation of a semi-conduction matrix, throughout which is dispersed metal particles of completely reduced, easily reduceable component.

U.S. Pat. No. 3,326,719 to Beltzer et al describes a metal coating method for non-conductive porous and non-porous substrates and to such metal coated non-conductive substrates. Steps of the process include dying the ceramic substrate with a reduced dye, or reducing the dye after it is applied, treating the dyed substrate with a noble metal, thereby making a thin, discontinuous metal coating on the dyed area, followed by contacting the substrate with a solution comprising a metal salt selected from the group consisting of copper, nickel and silver, resulting in formation of a continuous metal coating. The porosity of the substrate after metal coating is substantially the same as before coating. The thickness of the coating can be controlled by the number of times the catalytic reduction is carried out. Once a continuous layer of metal is formed on the substrate, other metals can be electro-deposited using the metal surface substrate as a cathode in conventional electro-deposition.

U.S. Pat. No. 3,551,997 to Etter discloses a method for electroless plating and brazing of insulating or semi-conducting members. Typically, the ceramic member has a thin metal layer of molybdenum over which is electrolessly plated a cobalt-copper alloy. Any substrate having an electrically conducting surface may be used to receive the electrolessly deposited cobalt-copper alloy. Details as to metallizing of the substrate are not provided.

U.S. Pat. No. 3,620,799 to Hoelscher et al describes a method for metallizing a ceramic body and to a ceramic-to-metal joint. Metallizing is accomplished by coating a surface of the ceramic body with a composition consisting essentially of 10 to 90 weight parts uncoated molybdenum or tungsten metal particles, 4 to 80 weight parts molybdenum or tungsten metal particles which have an adherent coating of nickel, iron, and/or cobalt metal, and 2 to 27 weight parts ceramic sinter powder consisting essentially of one or a combination of a magnesium-aluminum-silicate, a calcium-aluminum-silicate and a manganese-silicate. The coated body is then heated at metallizing temperature in the range of about 1100°–1500° centigrade in reducing atmosphere to produce a sintered metal coating on the ceramic body. Thereafter, the coated ceramic body may be brazed or soldered to a metal body or another metallized ceramic body.

U.S. Pat. No. 3,874,069 to Ingleby describes a method of bonding a silicon carbide body to a metal part by treatment of the surface of the silicon carbide body to remove free silicon therefrom, followed by electroplating with the metal. The electroplate is then bonded to the metal part. Free silicon may be removed by leaching the silicon carbide body in boiling 30 percent caustic soda for several hours. A standard nickel plating solution is satisfactory; copper is an alternative. The silicon carbide body itself is employed as a cathode during nickel plating. Electroplating is continued until the required thickness has been obtained, for example, between 0.020 and 0.050 inch. Free silicon may also be removed by immersion of the body in a hydrofluoric/nitric acid mixture.

U.S. Pat. No. 4,199,408 to Sherman discloses a method of forming a conductive pattern on projections of a ceramic substrate. The method described may include a conventional electroless plating sequence in which the substrate is treated with a sensitizing solution, e.g., aqueous $SnCl_2$, an activating solution, e.g., aqueous $PdCl_2$, followed by immersion in an electroless metal deposition solution. This sequence is described as a conventional electroless sequence, well known to those skilled in the electroless metal deposition art.

Kennametal Inc. Publication A80-184(10)FO, entitled "Designing With Kennametal," discloses brazed metal carbide, e.g., titanium carbide, to steel or other base alloys including special surface treatment to facilitate wetting by brazing alloys. The nature of this special surface treatment is not disclosed. Use of a sandwich braze in which a copper shim is brazed to each of the metal carbide and steel parts is disclosed for relief of strain otherwise induced during brazing due to dissimilar thermal expansion coefficients of the parts joined by brazing.

SUMMARY OF THE INVENTION

This invention provides a method for preparing a silicon carbide surface for joining by metal brazing to a metal comprising micro-roughening that surface of the silicon carbide which is to be brazed, applying a catalyst solution to the micro-roughened surface, electrolessly applying a thin layer of metal selected from Ni, Cr, Au, Ag and Cu, and applying a compliant layer of metal over the thin metal layer.

The present invention also provides an easily brazable silicon carbide article comprising a silicon carbide substrate having a thin, adherent, electrically conductive metal layer overlying the substrate and a compliant metal layer overlying the thin metal layer.

The present invention also provides a brazed ceramic-to-metal joint comprising a silicon carbide article, a metal article, a thin layer of metal adherent to the ceramic article, a compliant layer of metal overlying and adherent to the thin layer and a layer of brazing metal overlying the thin layer and joining the ceramic article to the metal article.

BRIEF DESCRIPTION OF THE DRAWINGS

The features of the present invention will become more fully apparent from the detailed description that follows, in conjunction with the accompanying drawings in which.

DETAILED DESCRIPTION OF PREFERRED EMBODIMENTS

Figure 1:
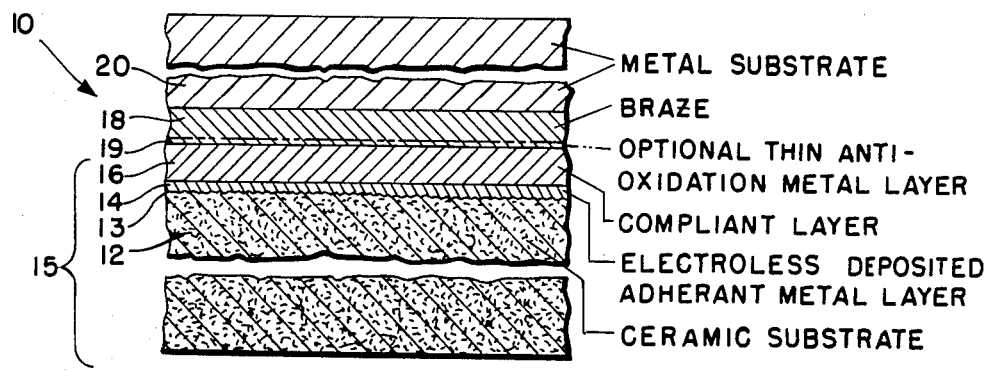
FIG. 1 is a cross-sectional view of a brazed silicon carbide ceramic-to-metal joint.

Referring to FIG. 1, there is illustrated a brazed ceramic-to-metal joint shown generally at number 10. Joint 10 includes a silicon carbide ceramic substrate 12 having a surface 13 which has been micro-roughened. Micro-roughening should be of the order of grain size of the ceramic substrate or smaller; i.e., in the micrometer range. A thin metal layer that is highly adherent to surface 13 overlies surface 13. A compliant layer 16 of a metal overlies thin metal layer 14. Overlying compliant layer 16 is layer 18 of a conventional brazing metal. The term "brazing" as employed herein is intended to include any metal or metal alloy which is used to join two or more metallic components by heating to the melting point of the braze which is lower than that of the component materials to be joined. In joint 10, braze 18 joins the compliant metal layer 16 with the metal substrate 20.

Figure 2:
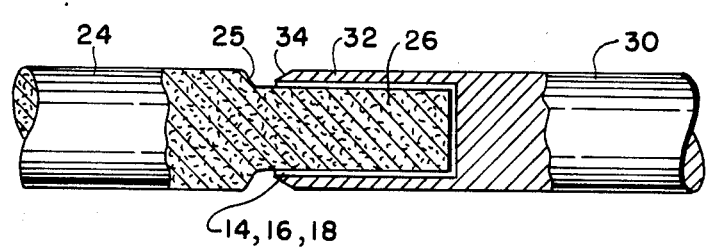
FIG. 2 is a side-elevational view, partially in section, of an embodiment of a joint between a silicon carbide shaft and a metal shaft.

As depicted in FIG. 2, the brazed joint of FIG. 1 may be employed to join a silicon carbide shaft 24 to a metal shaft 30. The silicon carbide shaft 24 includes an end portion 26 of reduced diameter which is inserted into hollow end 32 of metal shaft 30. The end portion 26 of shaft 24 has been treated so as to provide an etched surface comparable to surface 13 depicted in FIG. 1, to which is applied a thin adherent metal layer 14 by electroless deposition. Over the thin adherent metal layer 14 is applied a compliant layer 16 of copper of about 0.003 inch thickness. Brazing layer 18 is applied over layer 16, preferably in the form of a thin foil which is wrapped about compliant layer 16, over the end portion 26 of ceramic shaft 24. This assembly is thereafter inserted into the hollow end 32 of metal shaft 30. Bonding is thereafter accomplished by heating, e.g., by torch, electrical induction heating or heating in a conventional furnace.

Preferably, the hollow end 32 of metal shaft 30 is chamfered or tapered at its end 34 to a thin edge to minimize stress in ceramic shaft 24 at this location. Failure to provided a thinned end 34 of metal shaft 30 may result in premature failure of the end portion 26 of ceramic shaft 24 by fracture adjacent the end of the metal shaft 30.

Preferably, the end portion 26 is joined to ceramic shaft 24 through a tapered shoulder 25 with all junctions being radiused to minimize concentration of stresses in the ceramic shaft 24.

The present invention also relates to a readily brazable ceramic article 15 which includes, as shown in FIG. 1, a silicon carbide ceramic substrate 12 having a surface 13 thereof micro-roughened by etching. Adhered to surface 13 is a thin metal layer 14, e.g., of nickel. Overlying the thin metal layer 14 is a compliant layer 16 of metal, e.g., copper. Overlying the compliant layer 16 is preferably another thin layer 19 of a metal such as nickel to prevent oxidation of the compliant layer 16 prior to brazing. Article 15, which includes an outermost optional anti-oxidation layer 19, may be stored in open atmosphere for an indefinite length of time without loss of its capability to be readily brazed to a metal substrate.

The manner in which a silicon carbide ceramic substrate is prepared for joining to a steel substrate, and thereafter joined to such steel substrate, will now be described in detail by way of an example and with reference to FIGS. 2 and 1.

A sintered silicon carbide shaft 24 is to be joined to a steel shaft 30. The procedure comprises six major steps:
1. proper sizing of the attachment area, i.e., end 26, of the ceramic shaft relative to the metal shaft 30;
2. preparation of the surface of the ceramic shaft 24 preparatory to application of a thin adherent metallic coating 14;
3. application of a compliant layer 16 of metal over the adherent thin metallic coating 14;
4. final machining, if needed, of the outermost metal layer 16 to the required final dimension;
5. application of a brazing metal or alloy layer 18;
6. actual brazing by application of heat.

Step 1—Sizing of the attachment area.

The end portion 26 of silicon carbide shaft 24 should be about 0.006 inch less outside diameter than the inside diameter of the hollow end 32 of steel shaft 30. This may be accomplished by diamond grinding of the end portion 26 of the ceramic shaft 24 in a lathe.

Step 2—Cleaning and micro-roughening the ceramic attachment area.

Micro-roughening of the attachment area is needed to obtain a surface having a topography capable of receiving in interlocking manner the thin metal layer. Micro-roughening is best accomplished by chemical etching although mechanical means may be employed. After proper dimensioning, the end portion 26 of the silicon carbide shaft 24 must be cleaned to remove any contaminants such as oil or grease which may inhibit etching. Any suitable degreasing solvent may be employed. GENESOLV DMC ™, a methyl chloride-based solvent available from Allied Chemical, has been found to be effective. If any length of time has expired subsequent to the degreasing step, a final wash with acetone is performed immediately prior to etching. To avoid thermal shock, the ceramic shaft is preheated to the approximate temperature of the etchant bath. This additionally serves to prevent cooling of the etchant bath below its active temperature. A preferred etchant bath consists of one part of potassium hydroxide and one part of potassium nitrate heated to an active temperature of which is approximately 500°–600° C. This molten-salt bath is contained in a nickel crucible which may be heated with a bunsen burner. That the bath is sufficiently heated to be in an active state is indicated by the presence of an amber color of the etchant solution when at the appropriate temperature.

The end portion 26 of the silicon carbide shaft is immersed in the molten salt mixture for a time sufficient to cause micro-roughening of the surface as depicted at numeral 13 in FIG. 1. This is normally accomplished upon six to eight minutes immersion in the molten salt bath. That sufficient etching has occurred may be visually confirmed upon removal of the part from the molten salt bath and removal of the etchant from the surface of the part. Normally, as manufactured, sintered silicon carbide parts, even after diamond grinding, have a rather shiny surface. This surface, upon sufficient etching, is changed to a matt finish.

While the nature of the etching mechanism is not completely understood, it is believed that a chemical reaction occurs with the silicon carbide. For this reason, extreme caution is necessary in utilizing the molten bath. If the molten salt bath is overheated, it may become extremely reactive causing it to be violently thrown out of the crucible. After the silicon carbide part has been immersed in the molten salt bath for a sufficient time, it is removed and allowed to slowly cool in air.

An alternative etching procedure includes placing the silicon carbide part in a crucible at room temperature, adding crystalline room temperature etchant, heating the crucible and its contents in a closed furnace to melt the etchant and effect etching of the ceramic part, shutting off the furnace and letting the crucible and its contents cool in the closed furnace until below the boiling point of water.

Another etching procedure includes painting a saturated aqueous solution of etchant onto the silicon carbide part, heating the painted part to drive off the water, further heating the dried painted part to about 600° C., observing the etchant coating fuse and thereafter return to a solid state thereby indicating the end of reaction with the silicon carbide part, and cooling the part to below the boiling point of water. This procedure may have to be repeated to cause sufficient etching.

To avoid thermal shock, after cooling to below the boiling point of water, and preferably to well below the boiling point of water (for example, room temperature), the etchant, which has adhered to the end portion 26 of the silicon carbide shaft 24 is washed with tepid water and acetone and dried in air. The etched surface 13 should not be touched by human hands prior to metallizing.

Step 3—Metallizing the attachment area.

It is necessary to establish an adherent metallic layer. Because many silicon carbide materials are poor electrical conductors and thus cannot be directly and uniformly electroplated, the application of a thin adherent metallic layer 14 is accomplished by the catalyzed electroless deposition of a metal. The end portion 26 of silicon carbide shaft 24 to be catalyzed is preheated to about 80°–90° C. Thereupon, the catalyst is evenly applied. The catalyst may be applied by painting, spraying or immersion. To date, best results have been obtained with painting. The catalyst is a saturated solution/dispersion of $PdCl_2$ devoid of stannous chloride in distilled or deionized water. Less than 0.0001 gram of this catalyst per square inch is necessary to catalyze the surface of the silicon carbide part. The catalyst solution may be prepared by adding particulate palladous chloride to distilled or deionized water. The catalyst solution is maintained at or above room temperature. A sufficient amount of palladous chloride particulate is added so that the solution is saturated or super-saturated at room temperature. A suitable $PdCl_2$ powder is available from Alfa Products, Thiokol Neutron Division, Danvers, Mass.

After application of the catalyst, the treated silicon carbide part is allowed to dry. This may be accelerated by placing the catalyzed part in an oven at 80°–90° C.

The adherent thin metal layer 14 may be any that is easily electrolessly plated. Suitable metals include nickel, gold, silver, chromium and copper; preferred among these is nickel.

An eminently suitable nickel layer may be had by using an electroless solution known as PM-980, available from the Shipley Company, Newton, Mass. PM-980 is manufactured according to U.S. Pat. No. 3,001,920. The electroless bath is prepared as follows: 1 part of PM-980 is added to 6 parts distilled water; thereafter, the pH value is adjusted to between 8.5 and 9.5 by addition of ammonium hydroxide (29 weight percent $NH_3$). Approximately 1/5 part is required to bring the pH into the desired range. The bath is heated to about 70° C. and the warmed catalyst-treated silicon carbide shaft 24 transferred from an oven directly into the bath. Occurrence of electroless deposition is indicated by bubbles arising from the treated surfaces of the end portion 26 of shaft 24.

Electroless deposition is continued until a thin, highly adherent layer of mtal has been deposited over the entire attachment area. When nickel is employed, best results are obtained when a thickness of less than 0.0005 inch has been deposited. Excessive thickness reduces strength of the final brazed joint. For the conditions just stated, this occurs in approximately ten minutes. The cylindrical surface of end portion 26 must be completely coated with the thin metal layer; this can be visually confirmed with the naked eye. It is recommended that confirmation be made after about five minutes immersion in the electroless deposition bath. Areas which are not active metal deposition sites should be retreated with catalyst prior to continuance of electro-deposition.

Upon completion of electroless deposition, the ceramic part should be immediately washed with water and acetone to inhibit oxidation of the newly plated surface.

If the compliant layer 16 of metal is to be copper electroplated in a cyanide bath, the ceramic part is ready to be taken to such step.

If the compliant layer 16 is to be copper applied from an acid bath, further preparation of the end portion 26 is performed to provide a thin electrolessly deposited layer of copper over the nickel layer. In this instance, the end portion 26 is first catalyzed, for example, using Shipley Company catalyst 9-F. This bath may be prepared by adding two parts hydrochloric acid to two parts of deionized water, stirring and thereafter adding one part of Shipley catalyst 95. This bath should be used at a temperature of between 65°–100° F. The end 26 of the ceramic shaft 24 is immersed in this bath for about five minutes and thereafter removed and rinsed in clean running water. Following this, the shaft 24 is placed in an accelerator bath which may be prepared by adding one part of accelerator 9-F to five parts dionized water. The bath should be operated at between 70°–80° F. The catalyzed end portion 26 is soaked for about 10 minutes; thereafter, the end portion 26 is rinsed with cold running water. End portion 26 is then immersed in electroless-copper solution. A suitable electroless-copper solution is CUPOSIT Mix 328 from Shipley Company. This solution is employed in a bath of the following composition: to 1 part of CUPOSIT 328-A is added one part of CUPOSIT 328-B, followed by addition of 0.158 parts of CUPOSIT mix 328-C. The operating temperature of the bath should be about 70° F. The end portion 26 of the ceramic part should be immersed in this bath for about three hours resulting in deposition of approximately 0.00009 inch thickness copper on the end portion 26. The plated part is thereafter washed in cold running water and immediately washed in acetone to inhibit oxidation.

Step 4—Application of a compliant layer of metal.

The shaft 24 having a thin metallic layer 14, which is highly adherent to end portion 26, is wired with a copper wire adjacent tapered shoulder 25. The opposite end of this copper wire is connected to the negative (cathode side) of a direct current power supply. Standard commercially available copper-phosphorus anodes are immersed in the bath which contains a standard copper electroplating solution. A suitable acid plating acid solution is UDYLITE TM Bright Acid Copper Plating Process UBAC-1, available from Udylite Corporation, Detroit, Mich.

Plating time is of course dependent upon the current density and amperes per square foot. Utilizing the solution and arrangement just described, about 40 minutes are required to plate one thousandth of an inch per square foot at 25 amperes. To plate the end portion 26 of a shaft 24 whose end portion 26 has about 3 square inches of attachment surface area to be plated, a current of about 300 milliamps is applied for about 4.5 hours. After plating to the required thickness, the part is washed in running water, and immediately in acetone, to prevent oxidation. Preferably, the thickness of the compliant layer is from about 0.002 to 0.004 inch; more desirably, the thickness of the compliant layer is 0.003 inch. Suitable metals for the compliant layer include Cu, Ag, Au, Pt and brass, with Cu being preferred.

Step 5—Machining of the compliant metal layer to proper thickness.

In some instances, it may be necessary to finish machine the compliant metal layer 16. This will most commonly occur when the end portion 26 of the silicon carbide shaft has the configuration of a right cylinder. As is well known in the electroplating art, the amount of metal deposited is directly proportional to the current density, which is greatest at sharp corners such as at the end of the end portion 26. For this reason, the shaft end portion 26 is preferably formed so as to contain a tapered conical end (not illustrated) which is cut off subsequent to the electroplating of the compliant layer 16 of metal.

After application of the requisite thickness of compliant layer 16, there is optionally and preferably applied a thin electroless nickel coating. This thin protective metal layer 19 prevents oxidation of the compliant copper layer 16 and provides an easily wettable surface for the brazing metal. This optional nickel layer may be applied by painting the part with palladous chloride catalyst, immersing the catalyzed part in an electroless nickel bath and removing the part and rinsing it with water and acetone and drying the rinsed part. This step is needed for brazing a copper compliant layer 16 in air; it is not needed if inert gas or vacuum brazing are to be employed.

Step 6—Brazing.

Unless otherwise described, conventional brazing technology including fluxes is employed where applicable. Suitable brazing alloys and fluxes are available from Lucas-Milhaupt, Cudahy, Wis. These materials have the following general characteristics:

TABLE 1

| Alloy | Composition | Melting Point | Flow Point | Specific Gravity | Flux |
|---|---|---|---|---|---|
| (TEC) | 5% Ag—95% Cd | 340° C. | 395° C. | 8.82 gr/cc | TEC |
| Easy-flo TM | 50% Ag 15.5% Cu 16.5% Zn 18% Cd | 625° C. | 635° C. | 9.45 gr/cc | LT Flux |

Preferably, the brazing alloy is in the form of a thin foil which is wrapped around the end portion 26 of the silicon carbide shaft 24. The ceramic shaft 24 and the metallic shaft 30 are held in fixtures (not illustrated) with the ceramic shaft end portion 26 and brazing alloy layer 18 inserted into the hollow end 32 of the metal shaft 30. Alternatively, the brazing metal may be allowed to be drawn by capillary action into the remaining space between end portion 26 and hollow end 32. To prevent excessive heat transfer from the silicon carbide shaft and metal shaft to be joined, the fixtures may be formed of graphite.

When a protective atmosphere, e.g., inert gas or vacuum or suitable flux is employed, the brazing layer may also be the compliant layer. Soft solders, silver solders and copper are preferred for this purpose. As a specific example, brazing of an electroless nickel plated silicon carbide part to steel may be accomplished using copper metal in a vacuum furnace. In this instance, electroplating of a compliant layer of copper and application of a separate brazing alloy layer may be omitted. As another specific example, a ceramic part including an electrolessly plated nickel layer and an electroplated copper layer may be directly brazed to steel by heating in a vacuum furnace.

The method just described in detail is particularly suitable for use with ceramic substrates of sintered silicon carbide. Nickel has been found to be eminently suitable as an adherent layer 14 on the clean etched surface of a sintered silicon carbide substrate 12. Because the coefficient expansion of nickel is much greater than that of silicon carbide, the thickness of the electrolessly deposited nickel layer should be kept small to minimize stress. This is true respecting any metal because of the great difference in coefficient of thermal expansion between metals and known silicon carbide materials.

The catalyst solution for the electroless deposition of the adherent thin metal coating of nickel should be a saturated solution of palladous chloride, $PdCl_2$. This catalyst solution should not contain stannous chloride. Silicon carbide parts should not be treated with $SnCl_2$ before treatment with $PdCl_2$.

The term "compliant metal layer" refers to one which is capable of yielding without rupture to the forces arising between the metal and ceramic during the heating and cooling cycle of brazing. The compliant layer 16 has a Young's modulus which is lower than that of steel and very much lower than that of silicon carbide. The compliant layer 16, when of copper as aforedescribed, is about 80 percent dense. It is possible to have a compliant layer 16 of a metal whose inherent properties include a hardness and a Young's modulus much greater than those of copper. It is the characteristics of the layer 16, rather than those of the metal of which the layer is formed, which are critical. Suitable metals for formation of the compliant metal layer include copper, silver, gold, platinum the brass. If lower strength and temperature resistance is acceptable for the intended application, low and medium temperature solders, e.g., lead/tin and lead/tin/silver/gold and the like, may be used. If the compliant metal layer is too thin in a brazed joint between a silicon carbide shaft and a steel shaft, i.e., less than about 0.001 inch in thickness, premature failure of such brazed joint is likely. If the compliant metal layer is of excessive thickness, e.g., greater than about 0.004 inch in a brazed joint between a silicon carbide shaft and a steel shaft, failure of such brazed joint is likely to occur at or near to the inherent shear strength limit of the metal of which the compliant layer is formed.

Figure 3:
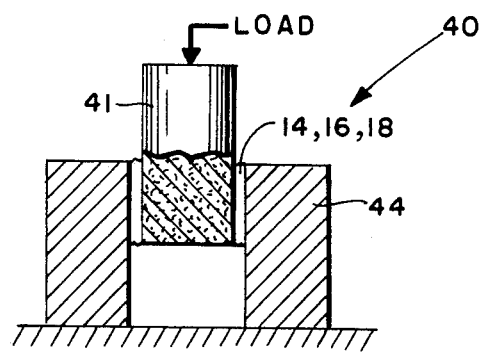
FIG. 3 is an elevational view, partially in section, of a test specimen used to determine the effectiveness of brazed ceramic-to-metal joints.

FIG. 3 illustrates a test specimen 40 which may be easily constructed and thereafter loaded as shown to determine the effectiveness of a brazed joint between ceramic substrate 41 and metal tube 44. Typical dimensions may be about ⅜ inch O.D. for the ceramic cylinder 41 with the I.D. of metal tube 44 being approximately 0.006 inch greater.

The following Table 2 demonstrates the resistance to shear stress of various brazed joints utilizing a pressureless sintered silicon carbide cylinder within a steel cylinder. In each example, the silicon carbide cylinder has an outside diameter of 0.365 inch. Unless otherwise specified, the silicon carbide cylinder was inserted into the hollow steel cylinder to a depth of ½ inch and held at this depth during brazing. In each of examples 1–4, failure occurred due to shearing within the brazing material. In example 5, no failure occurred upon reaching the 10,000 pound limit of the load cell. Examples 6 and 7 were prepared as example 5 except that the silicon carbide shaft was inserted ¼ inch into the steel cylinder and held in this position during brazing. In examples 6 and 7 failure occurred at more than 24,000 psi, which is above typical tensional stress or torsional stress failure values observed for pressureless sintered silicon carbide shafts of similar diameter.

TABLE 2

| Sample No. | Copper Compliant Layer Thickness (inches) | Steel Cylinder Inside Diameter (inches) | Brazing Material | Shear Stress (PSI) | Remarks |
| --- | --- | --- | --- | --- | --- |
| 1 | .001" | .373" | Kester 2.5 Ag—Pb solder. | 1744. | Did not fail limit of load cell. |
| 2 | .001" | .373" | Kester 2.5 Ag—Pb solder. | 1744. | Did not fail limit of load cell. |
| 3 | .003" | .375" | Kester 5.5 Ag—Pb solder. | 3230. | 0.0005" electroless Ni antioxidant coating. |
| 4 | .002" | .373" | Kester 5.5 Ag—Pb solder. | 3660. | 0.0005" electroless Ni antioxidant coating. |
| 5 | .004" | .377" | Handy & Harman Easyflo silver braze. | 17,440 (Did not fail) | 0.0005" electroless Ni antioxidant coating. |
| 6. | .003" | .375 | H & H Easyflo | 24,700 | SiC shaft inserted ¼" depth |
| 7. | .004" | .377 | H & H Easyflo | 25,430 | SiC shaft inserted ¼" same depth. |

While certain representative embodiments and details have been shown for the purpose of illustrating the invention, it will be apparent to those skilled in the art that various changes and modifications may be made therein without departing from the spirit or scope of the invention.

We claim:

1. A silicon carbide article which may be easily brazed to a metal article, the silicon carbide article comprising a silicon carbide substrate having a thin highly adherent layer of metal selected from the group consisting of Ni, Cr, Au, Ag or Cu applied to a surface thereof.

2. The silicon carbide article of claim 1 wherein said thin adherent layer is electrolessly deposited Ni having a thickness of less than 0.0005 inch.

3. The silicon carbide article of claim 2 further comprising a compliant layer of metal overlying said thin Ni layer, said compliant layer metal selected from the group consisting of Cu, Ag, Au, Pt and brass, said compliant layer having a thickness of from about 0.002 to about 0.004 inch.

4. The silicon carbide article of claim 3 wherein the compliant layer metal is electroplated Cu.

5. The silicon carbide article of claim 4 wherein a layer of Ni overlies the Cu layer.

6. A silicon carbide-to-metal joint comprising:
   (a) a silicon carbide article according to claim 1;
   (b) a metal article;
   (c) a compliant layer of metal overlying and adherent to said thin highly adherent metal layer; and
   (d) a brazing layer overlying said compliant layer and joining said silicon carbide article to said metal article wherein said compliant layer and said brazing layer are different layers.

7. The joint of claim 6 wherein the thin adherent layer is Ni having a thickness less than 0.0005 inch; the compliant layer is Cu having a thickness of from about 0.002 to about 0.004 inch and the brazing layer is of a metal or metal alloy having a melting point below that of the Ni or Cu layers.

8. A silicon carbide-to-metal joint comprising:
   (a) a silicon carbide article according to claim 1;
   (b) a metal article;
   (c) a compliant layer of metal overlying and adherent to said thin highly adherent metal layer wherein said compliant layer also functions as a brazing layer joining said silicon carbide article to said metal article.

9. The joint of claim 8 wherein the thin adherent layer is nickel having a thickness less than 0.0005 inch; and the compliant layer is copper having a thickness of from about 0.002 to about 0.004 inch.

* * * * *